US012693007B1

(12) United States Patent
Max

(10) Patent No.: US 12,693,007 B1
(45) Date of Patent: Jul. 28, 2026

(54) SOLAR POWERED LIGHT FOR PORTABLE TOILETS

(71) Applicant: Adrian Max, Albuquerque, NM (US)

(72) Inventor: Adrian Max, Albuquerque, NM (US)

( * ) Notice: Subject to any disclaimer, the term of this patent is extended or adjusted under 35 U.S.C. 154(b) by 0 days.

(21) Appl. No.: 19/094,068

(22) Filed: Mar. 28, 2025

(51) Int. Cl.

| | |
|---|---|
| ***F21V 33/00*** | (2006.01) |
| ***E04H 1/12*** | (2006.01) |
| ***F21S 9/03*** | (2006.01) |
| ***F21V 23/04*** | (2006.01) |
| ***F21Y 115/10*** | (2016.01) |

(52) U.S. Cl.
CPC ............ *F21V 33/006* (2013.01); *F21S 9/032* (2013.01); *F21V 23/0471* (2013.01); *E04H 1/1216* (2013.01); *F21Y 2115/10* (2016.08)

(58) Field of Classification Search
CPC ...... F21S 9/032; F21S 4/00; F21S 4/24; F21S 4/26; F21S 4/28; F21V 23/0471; F21V 33/006; E04H 1/1216; E04H 1/1244; F21Y 2103/10; F21Y 2103/30; F21Y 2115/10
See application file for complete search history.

(56) References Cited

U.S. PATENT DOCUMENTS

| | | | | |
|---|---|---|---|---|
| 2008/0313798 | A1* | 12/2008 | Kruger ................ | F21V 33/0088 4/479 |
| 2013/0335952 | A1 | 12/2013 | Bull | |
| 2017/0051486 | A1* | 2/2017 | Schomburg ............ | A47K 10/18 |
| 2018/0087789 | A1* | 3/2018 | Nunez ..................... | F24F 7/013 |
| 2023/0265671 | A1 | 8/2023 | Jensen et al. | |

FOREIGN PATENT DOCUMENTS

| | | | | |
|---|---|---|---|---|
| CN | 108843050 A | * 11/2018 | ............... | E03D 9/00 |
| EP | 2927563 A1 | * 10/2015 | .............. | F21S 8/033 |
| WO | WO-2021004206 A1 | * 1/2021 | ............... | E04H 1/12 |

* cited by examiner

*Primary Examiner* — Erin Kryukova
(74) *Attorney, Agent, or Firm* — Sanchelima & Associates, P.A.; Christian Sanchelima; Jesus Sanchelima

(57) ABSTRACT

A solar-powered lighting apparatus for portable toilets comprises an integrated electronic assembly mounted within the ceiling of a lightweight, weatherproof enclosure. The system includes a solar panel, photocell sensor, battery pack, digital controller, motion sensor, and LED light strip. Designed for autonomous operation, the apparatus generates and stores electrical energy from sunlight, activating illumination exclusively when human occupancy is detected during low-light conditions. The invention eliminates external power requirements, reduces energy consumption, and provides efficient, maintenance-free lighting for portable sanitation facilities across various indoor and outdoor settings.

4 Claims, 3 Drawing Sheets

SOLAR POWERED LIGHT FOR PORTABLE TOILETS

BACKGROUND OF THE INVENTION

1. Field of the Invention

The present invention relates to a solar-powered lighting system specifically designed for portable toilets, addressing the critical need for efficient, autonomous illumination in temporary or remote sanitation facilities. More particularly, the invention provides a self-contained lighting solution that leverages solar energy to enhance user experience and operational sustainability in portable toilet environments.

2. Description of the Related Art

While several designs for portable toilet lighting have been developed previously, existing solutions suffer from significant limitations. Current approaches typically rely on external power sources, require frequent maintenance, or provide inconsistent illumination.

Applicant believes a related reference corresponds to U.S. patent application publication No. 20130335952 A1 to Charlene Bull, published for a portable toilet solar light system that includes a solar panel and a batter. Applicant believes that another related reference corresponds to U.S. patent application publication No. 20230265671 A1 to Eric Andrew Jensen and Michael William Jensen, published for a portable bathroom with a set of lights which may be powered by solar panels. None of these references, however, teach of a solar-powered light for portable toilets that is comprised of an LED light strip with a motion detector that is installed on the interior ceiling of a portable toilet enclosure and powered by a battery bank with a solar panel and a photocell sensor which is disposed on the exterior roof of the enclosure. In one embodiment, the LED light strip is mounted along the perimeter of the interior ceiling to maximize illumination coverage.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a solar-powered light for portable toilets that eliminates the need for external power sources, reducing energy consumption and operating costs while promoting environmentally friendly energy use.

It is another object of this invention to provide a solar-powered light for portable toilets, wherein the sensor ensures the light functions effectively only during nighttime or low-light conditions, conserving energy and adapting seamlessly to environmental changes.

It is still another object of the present invention to provide a solar-powered light for portable toilets, wherein the combination of the solar panel and battery bank allows the system to operate autonomously, requiring minimal maintenance and no reliance on conventional power grids.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF THE EMBODIMENTS OF THE INVENTION

Figure 1:
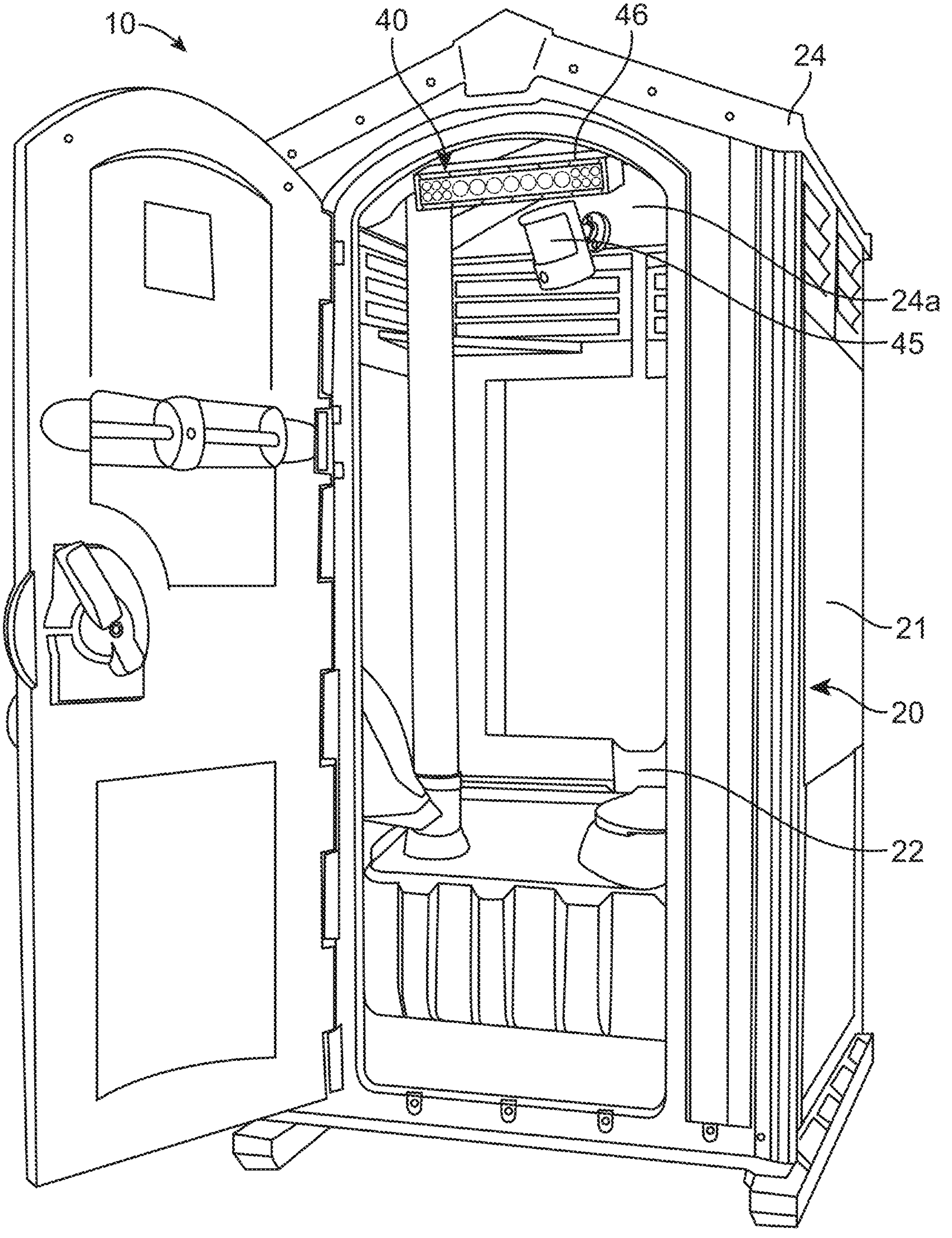
FIG. 1 represents an operational view of the present invention according to an exemplary embodiment thereof.

Referring now to the drawings, where the present invention is generally referred to with numeral 10, it can be observed that it basically includes a portable toilet 20 and an electronic assembly 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
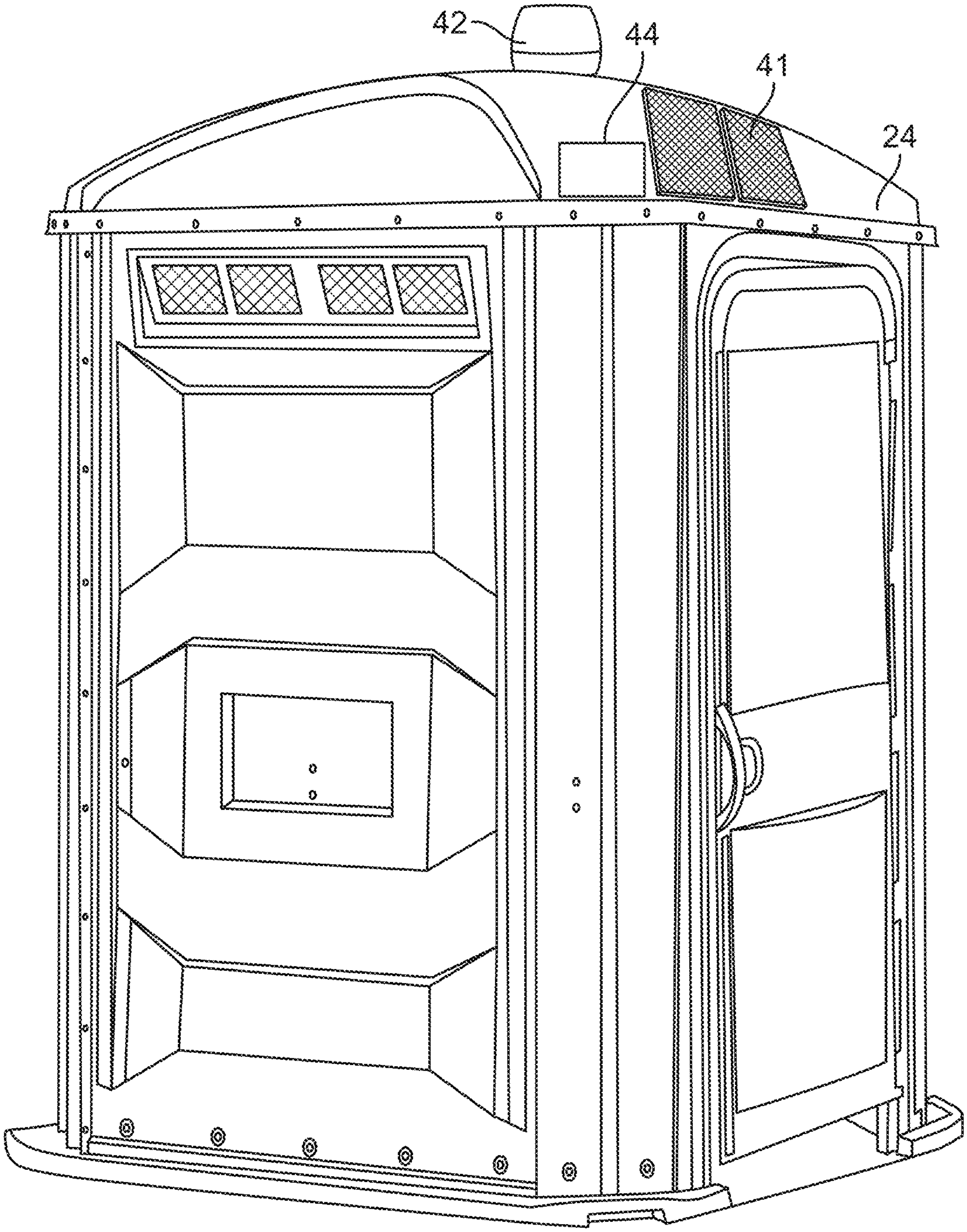
FIG. 2 shows an operational view of the present invention according to an exemplary embodiment thereof.
Figure 3:
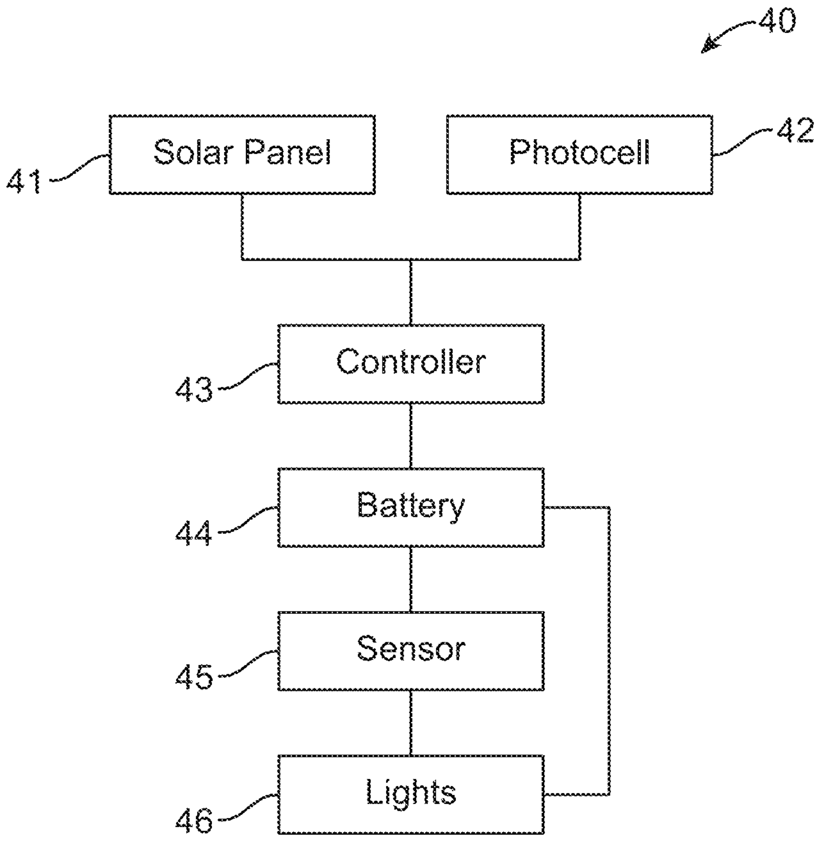
FIG. 3 illustrates a schematic diagram of the present invention according to an embodiment thereof.

As illustrated in FIG. 1-2, the present invention comprises a portable toilet 20 which is configured to provide a self-contained, sanitary facility that is easily transportable and suited for temporary or remote use. The portable toilet is particularly designed to be lightweight, durable, and capable of being used in various outdoor and indoor settings. Portable toilets, also termed as porta-potties, are widely known in the art and as such, may include various components outside the scope of the present disclosure. For the sake of simplicity, it will be said that the portable toilet 20 includes an enclosure 21, an enclosure's interior or interior 22, and a ceiling 24. It should be understood that the aforementioned elements are herein listed for explanatory purposes and should not be considered in a limiting sense; portable toilets are known in the art and may include more components than those specified herein.

The enclosure 21 may include a base, and vertical side walls forming a substantially cuboidal or cylindrical structure. The enclosure is constructed from a durable, lightweight material such as high-density polyethylene (HDPE) or fiberglass, which is resistant to weathering, impact, and corrosion. The enclosure may include a door with a hinged or sliding mechanism, providing a secure and easily accessible entry point. The door may further include a locking mechanism and an indicator (e.g., "occupied" or "vacant") for privacy. The ceiling 24 may be slightly domed or sloped to prevent water accumulation.

The electronic assembly 40 is strategically mounted on the ceiling 24 and the ceiling's interior 24*a* to optimize functionality and energy efficiency. This electronic assembly comprises several key components working in an integrated system: a solar panel 41, a photocell 42, a controller 43, a battery pack 44, a sensor 45, and lights 46.

The solar panel 41 is positioned on the exterior top of the ceiling 24 to maximize direct sunlight exposure, enabling optimal solar energy capture throughout the day. Simultaneously, the photocell 42 is placed adjacent to the solar panel, functioning as a light-sensitive device that monitors ambient light conditions and assists in determining the appropriate times for light activation.

The controller 43 serves as the critical management unit, processing and regulating the electrical energy generated by the solar panel. It performs sophisticated tasks such as voltage filtering, current regulation, and power management. The controller converts the solar panel's variable DC output into a stable electrical supply, protecting the battery pack 44 from potential voltage fluctuations and overcharging.

The battery pack 44, typically composed of rechargeable lithium-ion or sealed lead-acid batteries, stores the converted electrical energy. Its strategic placement on the ceiling ensures protection from external environmental factors while maintaining thermal stability. The battery pack provides a consistent power source for the lighting system, enabling operation during low-light conditions or nighttime when solar charging is unavailable.

The sensor 45, preferably a motion sensor such as a passive infrared (PIR) sensor, is precisely positioned on the ceiling's interior 24*a* and oriented towards the portable toilet's entrance. This sensor detects human movement within the enclosure, triggering the lights 46 only when occupancy is detected. Potential sensor technologies include passive infrared, microwave, ultrasound, or vibration-based motion detection, each offering unique sensitivity and activation characteristics.

The lights 46, configured as an LED light strip, are mounted along the ceiling's interior 24*a* to provide uniform illumination. LED technology ensures energy efficiency, long operational life, and minimal heat generation. The light strip's placement and design guarantee comprehensive coverage of the portable toilet's interior, ensuring visibility and user comfort during nighttime or low-light usage. In one embodiment, the LED light strip is mounted along the perimeter of the interior ceiling to maximize illumination coverage.

This integrated electronic assembly enables autonomous operation, with the system automatically managing power generation, storage, and lighting activation based on environmental and occupancy conditions, thereby maximizing energy conservation and user convenience.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A solar-powered lighting system for a portable toilet, comprising:

a. a solar panel mounted on an exterior roof of the portable toilet;

b. a battery pack electrically connected to said solar panel;

c. a LED light strip installed on an interior ceiling of the portable toilet; wherein said LED light strip is mounted along a perimeter of the interior ceiling of the portable toilet to provide uniform illumination across the interior of the portable toilet;

d. a motion sensor comprising a passive infrared sensor positioned to detect movement near the portable toilet's entrance and configured to activate said LED light strip upon detecting occupancy; and a photocell sensor disposed on said exterior roof adjacent to said solar panel to regulate light activation based on ambient light conditions.

2. The solar-powered lighting system of claim 1, further comprising a controller adapted to manage power flow between said solar panel, said battery pack, and said LED light strip, wherein said controller is configured to perform voltage filtering, current regulation, and power management to protect said battery pack from voltage fluctuations and overcharging.

3. The solar-powered lighting system of claim 1, wherein said battery pack comprises lithium-ion rechargeable batteries positioned on the interior ceiling to maintain thermal stability and protect said battery pack from external environmental factors.

4. A portable toilet lighting apparatus, consisting of:

a. a substantially lightweight, weatherproof enclosure having a slightly domed interior ceiling;

b. an integrated electronic assembly mounted entirely within said ceiling, said electronic assembly consisting of:

i. a solar panel positioned on an exterior surface of said ceiling;

ii. a photocell sensor positioned adjacent to said solar panel on the exterior surface of said ceiling;

iii. a battery pack electrically coupled to said solar panel and positioned on the interior ceiling to maintain thermal stability;

iv. a digital controller configured to manage power transfer and regulation between said solar panel and said battery pack including voltage filtering, current regulation, and overcharge protection;

v. a motion-activated passive infrared sensor positioned on the interior ceiling and oriented to detect human presence within said enclosure; and vi. a LED light strip mounted along an interior perimeter of said ceiling; wherein said electronic assembly operates autonomously to provide illumination solely upon detecting human occupancy during low-light conditions, powered exclusively by solar-generated electrical energy stored in said battery pack.

* * * * *